3,485,925
BACTERICIDAL AND FUNGICIDAL HALOATROPONITRILES
Calvin A. Page, Modesto, Calif., assignor to Shell Oil Company, New York, N.Y., a corporation of Delaware
No Drawing. Filed Oct. 16, 1967, Ser. No. 675,329
Int. Cl. A61l 23/00, 13/00; C07c 12/70
U.S. Cl. 424—304      11 Claims

ABSTRACT OF THE DISCLOSURE

Method of inhibiting the growth of microorganisms by treating them with novel ortho-haloatroponitriles, such as 2,5-dichloroatroponitrile.

Field of the invention

This invention relates to a method of killing or inhibiting the growth of microorganisms with novel microbicides. More particularly, the invention relates to a method of inhibiting the growth of microorganisms with novel ortho-haloatroponitriles.

Description of the prior art

Atroponitrile (alpha-cyanostyrene) and p-chloroatroponitrile (p-chloro-alpha-cyanostyrene) are known polymerizable monomers disclosed, for example, in U.S. 2,444,870. The patent does not disclose or suggest that these two compounds or the novel ortho-halogen substituted atroponitriles of the present invention have biocidal activity.

Summary of the invention

It is an object of the present invention to provide a novel method of inhibiting the growth of or killing microorganisms. Another object is to provide a novel method of inhibiting the growth of microorganisms by contacting the microorganism's habitat with an orthohaloatroponitrile. Yet another object is the provision for a novel microbicidal composition comprising an ortho-haloatroponitrile admixed with an inert carrier. The provisions for a method of inhibiting the growth of fungi by contacting the fungal habitat with an ortho-haloatroponitrile forms another object.

These objects are accomplished by a method comprising contacting the habitat of microorganisms with a growth-inhibiting amount of an ortho-haloatroponitrile having the formula

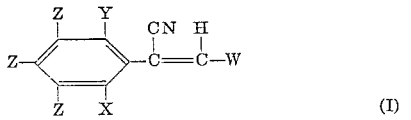

(I)

wherein W is hydrogen or halogen, X is halogen, Y is hydrogen or halogen, and each Z, which may be the same or different, is hydrogen, halogen or nitro with the proviso that when Y is halogen, W is hydrogen.

When the compounds of Formula I are halogen substituted in the beta position, i.e., W is halogen, they can take either of two stereoisomeric configurations, i.e., the cis or trans structure. While Formula I is not written to represent the isomeric configuration, both isomeric forms as well as mixtures are understood to be included in the present invention. For clarity and clear definition herein, the cyano moiety has been selected as the reference substituent; the isomer in which it and the halogen lie on the same side of the double bond is designated as the cis-configuration. The trans configuration, therefore, is the isomer in which the cyano and the halogen lie on the opposite side of the double bond. The isomeric configuration does not appear to have a great effect upon the biological activity of these compounds.

An examination of Formula I indicates that the benzene ring must be substituted by at least one halogen atom in the ortho position. The compounds may contain 1–4 additional halogen atoms by way of the 3-, 4-, 5- or 6-positions. Furthermore, the 3-, 4- and 5-positions may be substituted by 1–3 nitro groups.

The alpha-cyanovinyl side chain may also be monohalo-substituted in the beta-position when Y is hydrogen. Thus, the ortho-haloatroponitriles of the invention are substituted by from 1–5 halogen atoms and from 0–3 nitrogen atoms.

Typical ortho-monohalo ring-substituted atroponitriles of the invention are 2-fluoroatroponitrile, 2-chloroatroponitrile, 2 - iodoatroponitrile, beta,2 - dichloroatroponitrile, beta,2-dibromoatroponitrile and the like.

The dihalo ring-substituted ortho-haloatroponitriles include 2,3-dibromoatroponitrile, 2,4-difluoroatroponitrile, 2,5-dichloroatroponitrile, 2,6-dichloroatroponitrile, and their beta-halogen substituted counterparts such as beta, 2,3 - tribromoatroponitrile, beta,2-5-trichloroatroponitrile and the like.

Representative trihalo ring-substituted ortho-haloatroponitriles are 2,3,4-trifluoroatroponitrile, 2,3,5-trichloroatroponitrile, 2,4,6-triiodoatroponitrile, 2,3,6-trichloroatroponitrile, and their beta-halogen substituted counterparts such as beta,2,3,4-tetrachloroatroponitrile, beta, 2,3,5-tetrafluoroatroponitrile and the like.

Typical tetra- and pentahalo ring-substituted ortho-haloatroponitriles include 2,3,4,6-tetrabromoatroponitrile, 2,3,5,6-tetrabromoatroponitrile, 2,3,4,5,6-pentachloroatroponitrile and their beta-halogen substitute counterparts such as beta,2,3,4,5-pentachloroatroponitrile and the like.

Since ortho-haloatroponitriles of the invention also include those with nitro groups substituted in the 3-, 4- and 5-position, typical mononitro ring-substituted ortho-haloatroponitriles include 2-bromo-3-nitroatroponitrile, 2,3-dichloro - 5 - nitroatroponitrile, 2,6-difluoro-4-nitroatroponitrile, 2,3,4-tribromo-5-nitroatroponitrile, 2,4,6-triiodo-3-nitroatroponitrile, 2,3,5,6-tetrachloro-4-nitroatroponitrile and their beta-halogen substituted derivatives such as beta,2 - dibromo-3-nitroatroponitrile, beta,2,5-trichloro-4-nitroatroponitrile, beta,2,4,5 - tetrafluoro - 3-nitroatroponitrile and the like.

Representative dinitro ring-substituted ortho-haloatroponitriles are 2-chloro-3,4-dinitroatroponitrile, 2-bromo-3,5 - dinitroatroponitrile, 2,3 - diiodo - 4,5 - dinitroatroponitrile, 2,6 - dichloro - 3,5 - dinitroatroponitrile, 2,5,6 - tribromo-3,4-dinitroatroponitrile and their beta-halogen substituted counterparts such as beta,2-dicholoro-3,4-dinitroatroponitrile, beta,2,4 - trichloro - 3,5-dinitroatroponitrile, beta,2,5-tribromo-3,4-dinitroatroponitrile and the like.

Illustrative of the last group are the trinitro ring-substituted ortho-haloatroponitriles. These include 2-chloro-3,4,5-trinitroatroponitrile, 2,6 - dibromo - 3,4,5-trinitroatroponitrile and their beta-halogen substituted counterparts such as beta,2-dichloro-3,4,5-trinitroatroponitrile and the like.

The invention also includes those ortho-haloatroponitriles containing mixed halogen atoms, i.e., when more than one halogen substituent is present in the ortho-haloatroponitrile, they may be different.

The ortho-haloatroponitriles of this invention except those containing two ortho halogens, i.e., X and Y are both halogen, may be prepared by dehydration of the corresponding atropamides; the atropamides, in turn, are readily available by hydration-dehydration of the appropriate acetophenone cyanohydrins (alpha-methylmandelonitriles). Such cyanohydrins are derived by the reaction of acetophenones with hydrogen cyanide by known methods.

The 2,6-dihaloatroponitriles and the beta-unsubstituted atroponitriles may be prepared by the hydroxymethylation of an appropriate phenylacetonitrile using formaldehyde and basic catalyst.

These methods of preparation are more fully described in (P. 3,111 U.S. entitled "Pesticides" by Jerome G. Kuderna, Jr. filed on even date herewith) copending Ser. No. 675,297, filed Oct. 16, 1967.

The ortho-haloatroponitriles used in the present invention inhibit the growth of a broad spectrum of microorganisms including bacteria and fungi.

While it has been found that atroponitrile and p-chloroatroponitrile possess very slight microbicidal activity, as a practical matter, they cannot be used as biological chemicals because both readily polymerize at room temperature. The resulting polymeric products are microbiologically essentially inactive. Surprisingly, the ortho-haloatroponitriles of the present invention are considerably more stable to polymerization than the above two atroponitriles in addition to having greater microbicidal activities.

Description of the preferred embodiments

Although the halogen substituents denoted by the symbols W, X, Y and Z in the above formula may be selected from any of the halogens, e.g., fluorine, chlorine, bromine or iodine, the most active atroponitriles are those wherein the symbols denote middle halogen, i.e., chlorine or bromine, and Y is hydrogen. Accordingly, the preferred class of atroponitriles of this invention is that wherein Y is hydrogen and any halogens present in the W, X and Z positions are middle halogen.

Even more preferred because of their high microbicidal activity are those ortho-haloatroponitriles of Formula I in which W is hydrogen or chlorine, X is chlorine, Y is hydrogen, and each Z is hydrogen or chlorine. Of this subclass those substituted by three or more chlorine are most preferred.

Illustrative of those ortho-haloatroponitriles substituted by three chlorine atoms are 2,3,4-trichloroatroponitrile, 2,4,5-trichloroatroponitrile, beta,2,4-trichloroatroponitrile, beta,2,5-trichloroatroponitrile and the like.

The method of this invention can be applied to kill or inhibit the growth of both innocuous and nocuous microorganisms. Among the classes of microoganisms, the gram positive and acid fast bacteria and fungi, are the most susceptible to the treatment. The ortho-haloatroponitriles are particularly effective against the fungi, e.g., yeasts and molds.

In addition to having a high degree of effectiveness against a wide variety of pathogenic and nonpathogenic microorganisms, the atroponitriles of the present invention have the added advantage of being relatively nontoxic to mammal. In view of this low mammalian toxicity the compounds are useful microbicides in applications for warm-blooded animals. Therapeutic uses include the treatment of dermatophytic diseases such as Athlete's Foot. For example, one compound, beta,2,5-trichloroatroponitrile, applied to the skin of guinea pigs infected with *Trichophyton mentagrophytes*, cured 67% of the guinea pigs tested.

The method of the invention can also be applied to habitats of microorganisms on nonliving material, i.e., use as antiseptics and disinfectants.

The microbicides of the invention are most effectively employed with a carrier or diluent. Thus, compositions or formulations of the atroponitriles can be effected with either liquid or solid carriers. Liquid carriers wherein the atroponitrile is in solution, suspension or emulsion include water and organic solvents used as alcohols, ketones, aliphatic and aromatic hydrocarbons and halogenated aliphatic and aromatic hydrocarbon. Suitable surface active agents for suspending or emulsifying the atroponitrile with the liquid carrier may also be included. The conventional solid carriers such as talc, bentonite, kieselguhr, etc. may also be admixed with the atroponitriles to form the compositions of the invention.

The concentration of atroponitrile necessary for inhibiting the growth of microorganisms will vary with the particular species of atroponitrile, the type of microorganism, whether a carrier is included or not, environmental conditions, etc. Those skilled in the art can readily determine the suitable concentration for the particular application, however, e.g., by the use of controls. When the atroponitriles are admixed with a carrier, the atroponitrile will usually range from about 0.001 p.p.m. to 95% by weight of atroponitrile plus carrier.

The following examples illustrate the microbicidal activity of the ortho-haloatroponitriles used in the method of the invention.

Example I.—Toxicity data

As previously stated, one advantage of the atroponitriles of the invention is their low mammalian toxicity. Table I lists the toxicity of representative compounds represented by Formula I in terms of $LD_{50}$ for mice in mg./kg. Corn oil was the carrier used in all tests.

TABLE I

| Compound: | Oral $LD_{50}$ for mice in mg./kg. |
|---|---|
| 2,4-dichloroatroponitrile | 875 |
| 2,5-dichloroatroponitrile | 875 |
| Beta,2,4-trichloroatroponitrile (cis isomer) | 1170 |
| Beta,2,4-trichloroatroponitrile (trans isomer) | 1300 |
| Beta,2,5-trichloroatroponitrile | 1240 |
| 2,4,5-trichloroatroponitrile | 1250 |
| 2,4-dichloro-5-nitroatroponitrile | 405 |
| 4-bromo-beta,2-dichloroatroponitrile | 2500 |

Example II.—Bactericidal and fungicidal activity

Representative atroponitriles of Formula I were tested for their microbicidal activities against a wide variety of microorganisms. Table II lists the results of tests performed with various types of bacteria while Table III lists the results with various fungi.

The compounds to be tested were suspended or dissolved in acetone, isopropyl alcohol or other suitable solvents to form a concentrated solution or suspension. The final "use" concentrations were prepared by appropriate dilution of this concentrated solution or suspension. The final concentrations were added to sterile trypticase soy broth in tubes. The broth suspensions were then inoculated with 0.05 ml. of a broth culture of each test organism. All bacteria species were cultivated in trypticase soy broth while the yeasts and molds were cultivated in Sabourauds' maltose broth. Prior to their use in the tests, the bacterial or yeast cultures were incubated for 24 hours at 35° C.; mold cultures were incubated 72 to 120 hours at 25° C. The one exception was *Mycobacterium avium* which was incubated at 35° C. for 7 days in trypticase soy broth. After inoculation of the tubes with the test organisms, the tubes were incubated under standard appropriate conditions and examined for the presence of growth (no inhibitory effect) or the absence of growth (inhibition by the compound). These tubes were compared to a control culture and a chemical control series made in trypticase soy broth. In Table II, the symbol > indicates that there was no inhibition at that concentration. The concentration, in p.p.m. (parts per million), indicate the minimum concentration to inhibit the growth of the organism. The lowest and highest concentrations used were 0.062 p.p.m. and 128 p.p.m., respectively.

As previously indicated, p-chloroatroponitrile dimerizes on standing at room temperature. In comparative tests, this dimer failed to inhibit the growth of any of a wide variety of microorganisms tested. The conditions of the test were the same as those used for the orthohaloatroponitriles of this invention except that the p-chloroatroponitrile dimer was tested at a concentration of 32 p.p.m. The test organisms were

TABLE II

| Test Organisms | 2,4-dichloroatroponitrile | 2,3,4-trichloroatroponitrile | 2,4,5-trichloroatroponitrile | Beta,2,4-trichloroatroponitrile (trans isomer) | Beta,2,5-trichloroatroponitrile | 4-bromo-beta, 2-dichloroatroponitrile | 2,4-dichloro-5-nitroatroponitrile |
|---|---|---|---|---|---|---|---|
| Staphylococcus aureus, Smith strain | 32 | 2 | 0.5 | 32 | 8 | 2 | 2 |
| Staphylococcus aureus, FDA 209 strain | 32 | 1 | 1 | 32 | 8 | 2 | 2 |
| Staphyococcus aureus, Page | 32 | 2 | 0.5 | 32 | 8 | 2 | 0.5 |
| Bacillus subtilis | 32 | 1 | 2 | 8 | 4 | 2 | 8 |
| Listeria monocytogenes | 32 | 8 | 4 | 32 | 16 | 8 | 8 |
| Streptococcus pyogenes, ATCC 10402 | 16 | 2 | 2 | 8 | 8 | 8 | 2 |
| Streptococcus pyogenes, ATCC 10389 | 32 | 1 | 2 | 16 | 16 | 8 | 2 |
| Streptococcus fecalis | 64 | 8 | 4 | >128 | 16 | 8 | 8 |
| Erwinia carotovora | 32 | 32 | 8 | 32 | 64 | 16 | 16 |
| Escherichia coli, B | 128 | 128 | 32 | >128 | 128 | >128 | 32 |
| Escherichia coli, ATCC 9637 | >128 | 4 | 128 | >128 | 128 | >128 | 64 |
| Samonella schottmuelleri | >128 | >128 | >128 | >128 | >128 | >128 | 64 |
| Salmonella typhimurium | >128 | >128 | >128 | >128 | >128 | >128 | 64 |
| Salmonella pullorum | 128 | 4 | 64 | >128 | 32 | >128 | 4 |
| Salmonella choleraesuis | >128 | >128 | >128 | >128 | >128 | >128 | 128 |
| Pasteurella multocida | >128 | >128 | 64 | >128 | >128 | >128 | 32 |
| Proteus mirabilis | >128 | 32 | 32 | >128 | >128 | >128 | 32 |
| Proteus vulgaris | >128 | 128 | 64 | >128 | >128 | >128 | 32 |
| Shigella flexneri | 64 | 32 | 16 | >128 | 64 | >128 | 16 |
| Mycobacterium avium | 8 | 16 | 8 | 16 | 64 | 16 | 8 |
| Mycobacterium smegatis | 16 | 8 | 4 | 16 | 64 | 16 | 8 |
| Mycobacterium phlei | 16 | 4 | 4 | 8 | 32 | 16 | 8 |

TABLE III

| Test Organisms | 2,4-dichloroatroponitrile | 2,3,4-trichloroatroponitrile | 2,4,5-trichloroatroponitrile | Beta,2,4-trichloroatroponitrile (trans isomer) | Beta,2,5-trichloroatroponitrile | 4-bromo-beta, 2-dichloroatroponitrile | 2,4-dichloro-5-nitroatroponitrile |
|---|---|---|---|---|---|---|---|
| Aspergillus niger | 2 | 1 | 0.5 | 2 | 0.125 | 1 | 4 |
| Aspergillus tamarii | 2 | 4 | 0.25 | 2 | 0.25 | 0.5 | 2 |
| Chaetomium globosum | 2 | 0.062 | 0.062 | 0.25 | 1 | 0.5 | 0.062 |
| Cladosporium resinae | 2 | 0.125 | 0.062 | 0.25 | 4 | 0.062 | 0.125 |
| Epidermophton floccosum | 0.125 | 0.125 | 0.062 | 0.25 | 0.062 | 0.062 | 0.062 |
| Fusarium moniliforme | 2 | 1 | 0.25 | 1 | 0.5 | 0.5 | 4 |
| Hormodendrum sp | 0.5 | 0.25 | 0.062 | 0.125 | 0.062 | 0.125 | 0.5 |
| Memnoniella echinata | 2 | 1 | 0.5 | 4 | 0.25 | 0.5 | 2 |
| Microsporum gypseum | 0.5 | 0.062 | 0.062 | 0.062 | 0.25 | 0.062 | 0.062 |
| Penicillium citrinum | 2 | 1 | 0.062 | 1 | 0.5 | 0.125 | 1 |
| Penicillium italicum | 0.5 | 1 | 0.25 | 1 | 0.062 | 0.062 | 2 |
| Polyporus tulipiferus | 0.062 | 0.062 | 0.062 | 0.062 | 0.062 | 0.062 | 0.062 |
| Poria monticola | 1 | 0.5 | 0.25 | 1 | 0.25 | 0.5 | 1 |
| Sclerotium rolfsii | 0.062 | 0.5 | 0.25 | 0.062 | 2 | 0.125 | 0.062 |
| Trichoderma sp | 1 | 1 | 0.25 | 1 | 0.125 | 0.25 | 1 |
| Trichophyton metagrophytes | 0.5 | 0.062 | 0.062 | 0.25 | 0.5 | 0.062 | 0.125 |
| Candida albicans | 2 | 0.5 | 0.25 | 2 | 0.25 | 1 | 1 |
| Candida mycoderma | 2 | 1 | 0.5 | 2 | 0.25 | 1 | 0.5 |
| Saccharomyces cerevisiae | 2 | 0.5 | 0.25 | 1 | 0.25 | 1 | 0.5 |

*Staphylococcus aureus, Escherichia coli, Proteus vulgaris, Bacillus subtilis, Corynebacterium equi, Candida albicans, Erwinia carotovora, Mycobacterium avium, Aspergillus niger* and *Penicillium citrinum*.

I claim as my invention:

1. A method of inhibiting the growth of microorganisms consisting of fungi and bacteria comprising contacting the microorganism habitat with a growth-inhibiting amount of an ortho-haloatroponitrile of the formula:

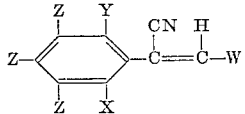

wherein W is hydrogen or halogen, X is halogen, Y is hydrogen or halogen and each Z is hydrogen, halogen or nitro with the proviso that when Y is halogen, W is hydrogen.

2. The method of claim 1 wherein any halogen present in the W, X, Y or Z position is middle halogen.

3. The method of claim 2 wherein Y is hydrogen.

4. The method of claim 1 wherein W is hydrogen or chlorine, X is chlorine, Y is hydrogen and each Z is hydrogen or chlorine.

5. The method of claim 4 wherein said ortho-haloatroponitrile is substituted with at least three chlorine atoms.

6. The method of claim 5 wherein said ortho-haloatroponitrile is beta,2,5-trichloroatroponitrile.

7. The method of claim 5 wherein said ortho-haloatroponitrile is 2,4,5-trichloroatroponitrile.

8. The method of claim 5 wherein said ortho-haloatroponitrile is 2,3,4,trichloroatroponitrile.

9. The method of claim 5 wherein said ortho-haloatroponitrile is beta,2,4-trichloroatroponitrile.

10. The method of claim 3 wherein said ortho-haloatropontrile is 2,4-dichloroatroponitrile.

11. A composition effective against fungi and bacteria comprising an inert carrier and from about 0.001 part per million to 95% by weight thereof of an ortho-haloatroponitrile having the formula wherein W is hydrogen or halogen, X is halogen, Y is hydrogen or halogen, and each Z is hydrogen, halogen or nitro with the proviso that when Y is halogen, W is hydrogen.

References Cited

UNITED STATES PATENTS 3,250,798  5/1966  Shulgin _____ 424—304
3,290,353  12/1966  Battershell et al. _____ 424—304

ALBERT T. MEYERS, Primary Examiner
D. M. STEPHENS, Assistant Examiner

U.S. Cl. X.R.
260—465